US012696113B2

(12) United States Patent
Chen et al.

(10) Patent No.: US 12,696,113 B2
(45) Date of Patent: Jul. 28, 2026

(54) SUSPENDED SECONDARY CELL GROUP (SCG) STATE RELAXED MEASUREMENTS

(71) Applicant: Apple Inc., Cupertino, CA (US)

(72) Inventors: Yuqin Chen, Beijing (CN); Adesh Kumar, Cupertino, CA (US); Dawei Zhang, Cupertino, CA (US); Fangli Xu, Beijing (CN); Haijing Hu, Cupertino, CA (US); Jie Cui, Cupertino, CA (US); Naveen Kumar R. Palle Venkata, San Diego, CA (US); Sethuraman Gurumoorthy, Cupertino, CA (US); Srirang A. Lovlekar, Cupertino, CA (US); Yang Tang, Cupertino, CA (US); Zhibin Wu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,391

(22) PCT Filed: Sep. 27, 2020

(86) PCT No.: PCT/CN2020/118169
§ 371 (c)(1),
(2) Date: Sep. 21, 2021

(87) PCT Pub. No.: WO2022/061830
PCT Pub. Date: Mar. 31, 2022

(65) Prior Publication Data
US 2023/0217276 A1 Jul. 6, 2023

(51) Int. Cl.
H04W 24/08 (2009.01)
H04B 17/318 (2015.01)
(Continued)

(52) U.S. Cl.
CPC ........... H04W 24/08 (2013.01); H04W 24/10 (2013.01)

(58) Field of Classification Search
CPC ..... H04W 24/02; H04W 24/08; H04W 24/10; H04W 36/0061; H04W 36/0064;
(Continued)

(56) References Cited

U.S. PATENT DOCUMENTS 10,601,556 B2 * 3/2020 Teyeb ................ H04W 72/0453
2014/0171086 A1 * 6/2014 Nakamori ......... H04W 36/0088
455/436
(Continued)

FOREIGN PATENT DOCUMENTS

CN 110786030 A 2/2020
CN 111132217 A 5/2020
(Continued)

OTHER PUBLICATIONS

International Search Report Dated Jun. 28, 2021 for International Application PCT/CN2020/118169.
(Continued)

*Primary Examiner* — Moo Jeong
*Assistant Examiner* — Scott A Schlack
(74) *Attorney, Agent, or Firm* — Eschweiler & Potashnik, LLC; Ningjiao Zhang

(57) ABSTRACT

Techniques discussed herein can facilitate suspended secondary cell group (SCG) state relaxed measurements. One example aspect is a user equipment (UE) device, comprising: a memory; an antenna; a transceiver connected to the antenna; and a processor configured to: while in a dual connectivity (DC) mode where the UE is connected to a master node (MN) associated with a master cell group (MCG) and a secondary node (SN) associated with a SCG comprising a primary secondary cell (PSCell), receive a
(Continued)

signaling from a base station (BS) comprising an indication to enter a suspended state for the secondary cell group (SCG), in response to the signaling, enter the suspended state for the SCG, while in the suspended state for the SCG, perform relaxed measurements on the PSCell; and send, to the BS, a measurement report comprising a one or more measurement results from the relaxed measurements.

20 Claims, 9 Drawing Sheets

(51) Int. Cl.

| | |
|---|---|
| *H04W 24/10* | (2009.01) |
| *H04W 52/02* | (2009.01) |
| *H04W 76/15* | (2018.01) |
| *H04W 76/27* | (2018.01) |
| *H04W 76/28* | (2018.01) |

(58) Field of Classification Search

CPC ......... H04W 36/0066; H04W 36/0069; H04W 36/0088; H04W 36/0094; H04W 76/15; H04W 76/18; H04W 76/19; H04W 76/27; H04W 76/28; H04W 76/30; H04W 76/38; H04W 52/0229; H04W 52/0232; H04W 52/0258; H04W 72/0453; H04W 72/085

See application file for complete search history.

(56) References Cited

U.S. PATENT DOCUMENTS

| | | | | |
|---|---|---|---|---|
| 2017/0171768 | A1* | 6/2017 | Kim | ......................... H04L 5/001 |
| 2017/0311370 | A1 | 10/2017 | Dalsgaard | |
| 2020/0288338 | A1* | 9/2020 | Freda | ..................... H04W 76/19 |
| 2021/0105719 | A1* | 4/2021 | Thangarasa | ....... H04W 52/0229 |
| 2022/0046522 | A1* | 2/2022 | Kim | ...................... H04W 76/34 |
| 2022/0217565 | A1* | 7/2022 | Thangarasa | ........... H04W 76/28 |
| 2023/0102370 | A1* | 3/2023 | Thangarasa | ....... H04W 52/0251 |
| | | | | 370/311 |
| 2023/0109703 | A1* | 4/2023 | Sun | ...................... H04W 24/08 |
| | | | | 370/329 |
| 2023/0239712 | A1* | 7/2023 | Kuang | .............. H04W 52/0216 |
| 2023/0276321 | A1* | 8/2023 | Da Silva | ........... H04W 36/0088 |
| | | | | 370/252 |
| 2023/0284312 | A1* | 9/2023 | Parichehrehteroujeni | ................... |
| | | | | H04W 76/27 |
| | | | | 370/216 |

FOREIGN PATENT DOCUMENTS

| | | | |
|---|---|---|---|
| WO | 2018085049 | A1 | 5/2018 |
| WO | 2019099550 | A1 | 5/2019 |
| WO | 2019211792 | A1 | 7/2019 |
| WO | 2020/114372 | A1 | 6/2020 |
| WO | 2022/031206 | A1 | 2/2022 |

OTHER PUBLICATIONS

International Written Opinion Dated Jun. 28, 2021 for International Application PCT/CN2020/118169.

Qualcomm Incorporated; "Further Discussion on Suspension of SCG"; 3GPP TSG RAN WG2; Meeting #108; R1-1914364; Nov. 22, 2019.

Qualcomm Incorporated; "Introducing Suspension of SCG"; 3GPP TSG RAN WG2; Meeting #107bis; R2-1912197; Oct. 18, 2019.

Ericsson; "On Rel-17 MR-DC/CA Continuation"; 3GPP TSG-RAN Meeting #85; RP-192159; China; Oct. 14-18, 2019.

Huawei; "New WID on Further Enhancements on Multi-Radio Dual-Connectivity"; 3GPP TSG RAN Meeting #86; RP-193249; Spain; Dec. 9-12, 2019.

"5G; NR; Requirements for Support of Radio Resource Management"; 3GPP TS 38.133 Version 15.6.0 (Release 15); ETSI TS 138 133; Jul. 2019.

International Preliminary Report on Patentability Dated Mar. 28, 2023 for International Application PCT/CN2020/118169.

Qualcomm Incorporated: "Serving cell RRN relaxation for WUS-capable UE"; 3GPP TSG-RAN WG4 Meeting #86bis; R4-1804414; Apr. 16, 2018.

Ericsson: R2-2004715, "Measurement priority handling in NR", 3GPP TSG RAN WG2 #110-E; 3GPP server publication date: May 21, 2020.

Korean Office Action dated Jan. 19, 2026 in connection with Application No. 10-2023-7009854.

Chinese Notice of Grant mailed Mar. 24, 2026 in connection with application No. 2020801055293.

* cited by examiner

SUSPENDED SECONDARY CELL GROUP (SCG) STATE RELAXED MEASUREMENTS

REFERENCE TO RELATED APPLICATIONS

This application is a National Phase entry application of International Patent Application No. PCT/CN2020/118169 filed Sep. 27, 2020, entitled "SUSPENDED SECONDARY CELL GROUP (SCG) STATE RELAXED MEASURE- MENTS", the contents of which are herein incorporated by reference in their entirety.

BACKGROUND

Mobile communication in the next generation wireless communication system, 5G, or new radio (NR) network will provide ubiquitous connectivity and access to information, as well as ability to share data, around the globe. 5G networks will be a unified, service-based framework that will target to meet versatile and sometimes, conflicting performance criteria and provide services to vastly hetero- geneous application domains ranging from Enhanced Mobile Broadband (eMBB) to massive Machine-Type Com- munications (mMTC), Ultra-Reliable Low-Latency Com- munications (URLLC), and other communications. In gen- eral, NR will evolve based on third generation partnership project (3GPP) long term evolution (LTE)-Advanced tech- nology with additional enhanced radio access technologies (RATs) to enable seamless and faster wireless connectivity solutions.

DETAILED DESCRIPTION

Figure 1:
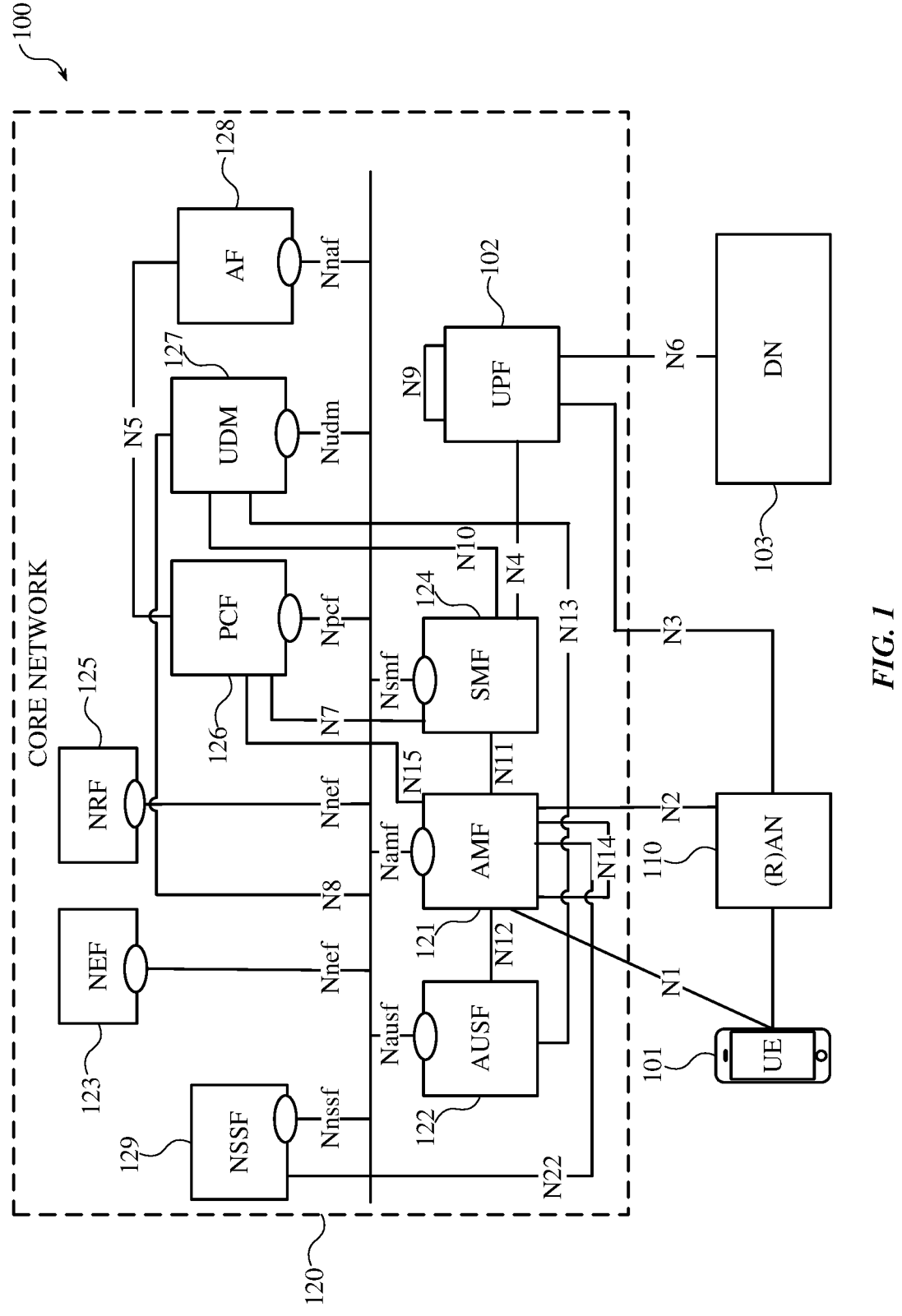
FIG. 1 illustrates an architecture of a system including a Core Network (CN), for example a Fifth Generation (5G) CN (5GC), in accordance with various aspects.

The present disclosure will now be described with refer- ence to the attached drawing figures, wherein like reference numerals are used to refer to like elements throughout, and wherein the illustrated structures and devices are not nec- essarily drawn to scale. As utilized herein, terms "compo- nent," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to commu- nicate via a 3GPP RAN, etc.) with a processing device. By way of illustration, an application running on a server and the server can also be a component. One or more compo- nents can reside within a process, and a component can be localized on one computer and/or distributed between two or more computers. A set of elements or a set of other com- ponents can be described herein, in which the term "set" can be interpreted as "one or more," unless the context indicates otherwise (e.g., "the empty set," "a set of two or more Xs," etc.).

Further, these components can execute from various com- puter readable storage media having various data structures stored thereon such as with a module, for example. The components can communicate via local and/or remote pro- cesses such as in accordance with a signal having one or more data packets (e.g., data from one component interact- ing with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components with- out mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Mobile communications in next generation wireless communication systems continue to include features that support efficient use of resources while simultaneously supporting higher communication bandwidths and reliability. NR networks implement dual connectivity (DC) as a means to achieve higher fidelity communication systems. A master cell group (MCG) and secondary cell group (SCG) enable simultaneous communication of data on multiple component carriers from two cell groups.

During times in which traffic conditions are adjusted, it can be advantageous to enter a suspended state associated with the SCG. In a suspended state for the SCG, various UE behaviors associated with the SCG can be canceled. For example, in the SCG suspended state, the UE can cancel physical downlink control channel (PDCCH) monitoring, random access channel (RACH)/physical uplink shared channel (PUSCH)/physical dedicated shared channel (PDSCH)/sounding reference signal (SRS) transmissions, beam/channel status information (CSI) measurements, and adaptive gain control (AGC).

In a suspended state for the SCG, various measurements that the UE may perform on the PSCell can be reduced to subsets of measurements, or measurements taken over longer periods, such reduced measurement will hereafter be referred to as relaxed measurements. For example, where the UE might perform measurements on the PSCell over a broad bandwidth of frequencies, the relaxed measurements performed on the PSCell may include measurements over a narrower bandwidth of frequencies. Furthermore, where a UE might perform measurements on the PSCell with a first periodicity, the relaxed measurements performed on the PSCell may occur according to a second periodicity that is longer than the first periodicity.

In a suspended state for the SCG, various measurements that the UE may perform on secondary cell(s) (SCell(s)) may also be relaxed measurements. For example, the SCell (s) can be considered as being in a deactivated state where the UE skips measurements on the SCell(s) during the SCG suspended state. Alternatively, the SCell(s) can be considered as being in a deactivated state and the UE can perform variations of relaxed measurements, as previously described for the PSCell, on the SCell(s).

Since the UE performs relaxed measurements in the suspended state for the SCG, the UE can use the relaxed measurements to enable a fast return to DC operations when required. In doing so, the UE's behavior is simplified resulting in power savings. Signaling overhead is reduced as the signaling from the UE to the SCG is reduced.

Various aspects of the present disclosure are directed towards a suspended state for the SCG. Relaxed measurement methods on the PSCell associated with the suspended state for the SCG are presented. Additionally, relaxed measurement methods for SCell(s) and neighboring cells are presented. Aspects of the present disclosure enable power savings, reduced signaling overhead, and reduced latency for DC mode cell operations.

Aspects described herein can be implemented into a system using any suitably configured hardware and/or software. FIG. 1 illustrates an architecture of a system 100 including a Core Network (CN) 120, for example a Fifth Generation (5G) CN (5GC), in accordance with various aspects. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129, which can be connected by various interfaces and/or reference points, for example, as shown in FIG. 1.

Figure 2:
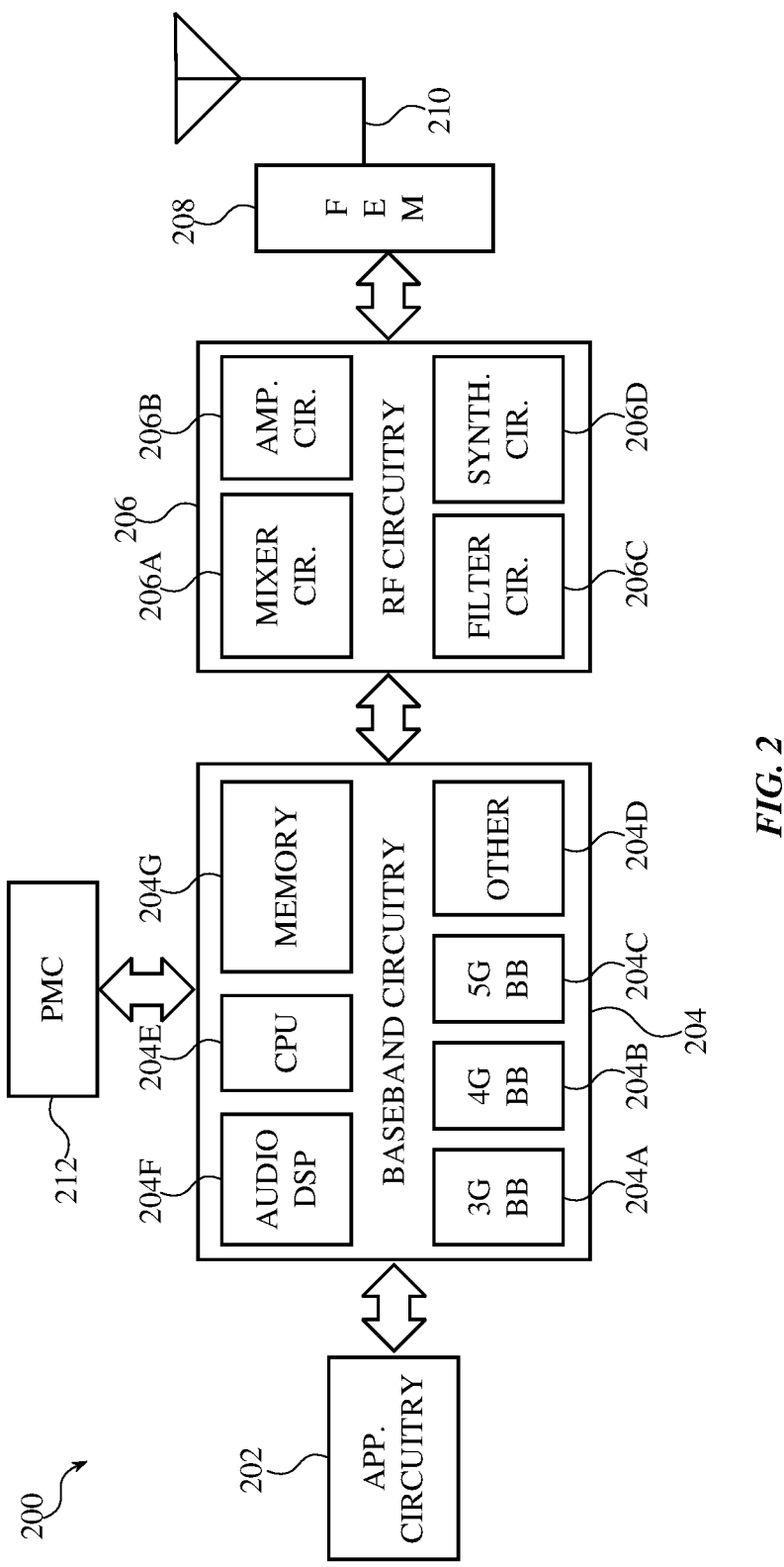
FIG. 2 is a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node may not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O)

interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The one or more audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the application circuitry 202 depending on the desired output frequency. In some aspects, a divider control input (e.g., N) can be determined from a look-up table based on a channel indicated by the application circuitry 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM circuitry 208, or in both the RF circuitry 206 and the FEM circuitry 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 202 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
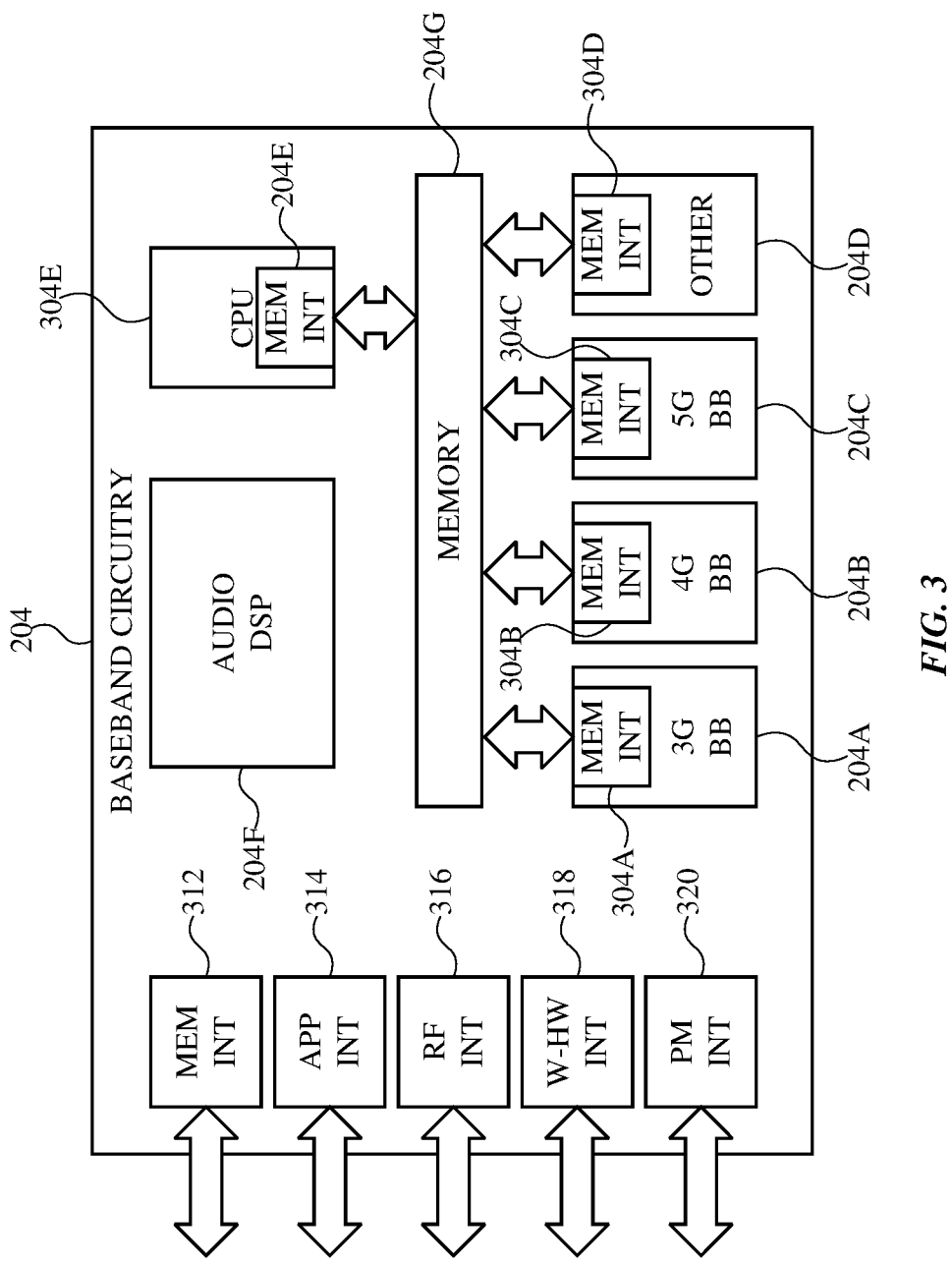
FIG. 3 is a diagram illustrating example interfaces of baseband circuitry that can be employed in accordance with various aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

As discussed in greater detail herein, various aspects, which can be employed, for example, at a UE, can facilitate power management in connection with wireless modem(s). Various aspects can employ power management techniques discussed herein, wherein, based on monitored levels of power consumption and temperature, one or more power management stages discussed herein can be employed to mitigate overheating. Power management stages discussed herein can reduce power consumption and associated overheating caused by 5G (Fifth Generation) NR (New Radio) operation, LTE (Long Term Evolution) operation, or both.

Figure 4:
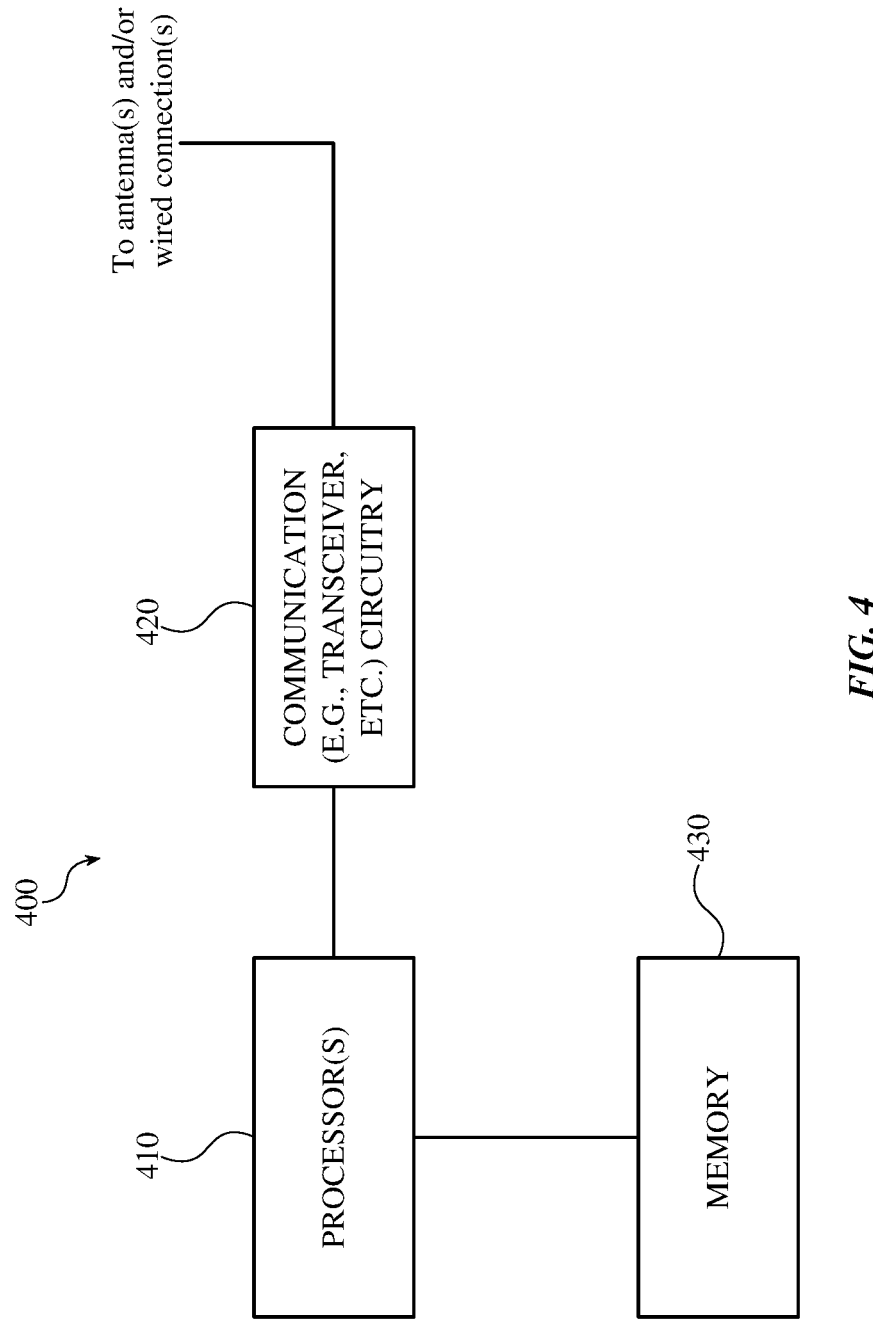
FIG. 4 is a block diagram illustrating a system that facilitates power management in connection with wireless modem(s), according to various aspects discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates power management in connection with wireless modem(s), according to various aspects discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or communication circuitry 420).

Specific types of aspects of system 400 (e.g., UE aspects) can be indicated via subscripts (e.g., system $400_{UE}$ comprising processor(s) $410_{UE}$, communication circuitry $420_{UE}$, and memory $430_{UE}$). In some aspects, such as BS aspects (e.g., system $400_{gNB}$) and network component (e.g., UPF (User Plane Function), etc.) aspects (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In aspects, signaling or messaging between different aspects of system 400 (e.g., 4001 and 4002) can be generated by processor(s) 4101, transmitted by communication circuitry 4201 over a suitable interface or reference point (e.g., a 3GPP air interface, N3, N4, etc.), received by communication circuitry 4202, and processed by processor(s) 4102. Depending on the type of interface, additional components (e.g., antenna(s), network port(s), etc. associated with system(s) 4001 and 4002) can be involved in this communication.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

The 3GPP (Third Generation Partnership Project) technical specifications (TSs) define optional power management related messages between a UE (User Equipment) and Base Station (BS, e.g., eNB (Evolved Node B) or gNB (next generation Node B), etc.).

Figure 5:
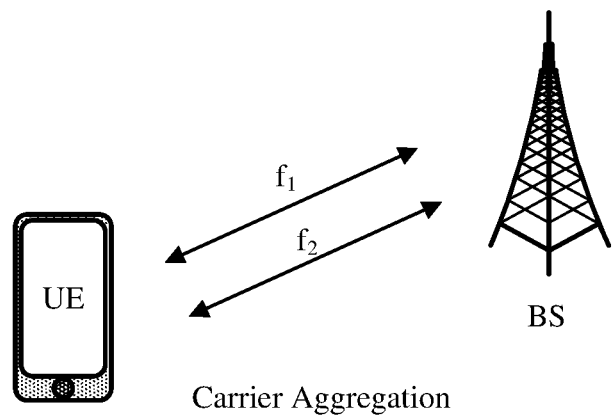
FIG. 5 illustrates a carrier aggregation (CA) mode of operation.
Figure 6:
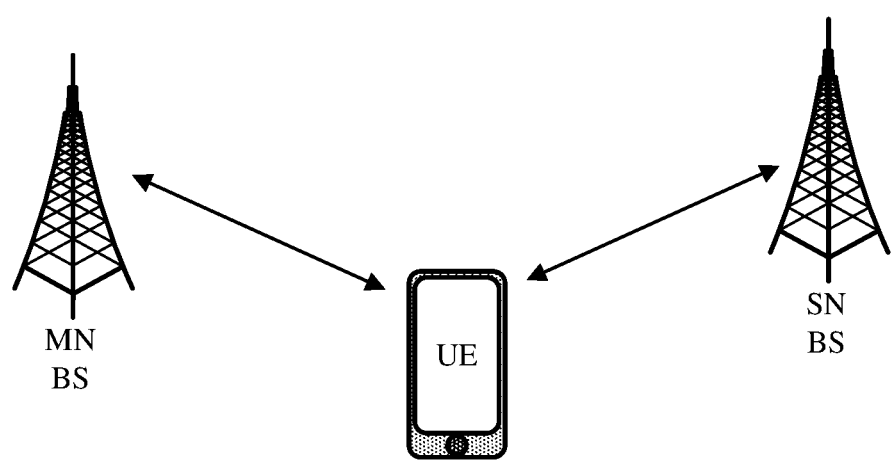
FIG. 6 illustrates a dual connectivity (DC) mode of operation.

FIG. 5 shows a UE in a CA mode with a BS. In CA mode the UE and BS combine two or more carriers into a single data channel thereby increasing the data rate. FIG. 6 show a UE in a DC mode with a master node (MN) BS and a secondary node (SN) BS. The SN BS consists of a group of cells for the SCG, including a PSCell.

In DC mode, the UE engages in communications with the MN BS and SN BS simultaneously thereby increasing the data rate and providing load balancing among different BS.

Figures 7, 8:
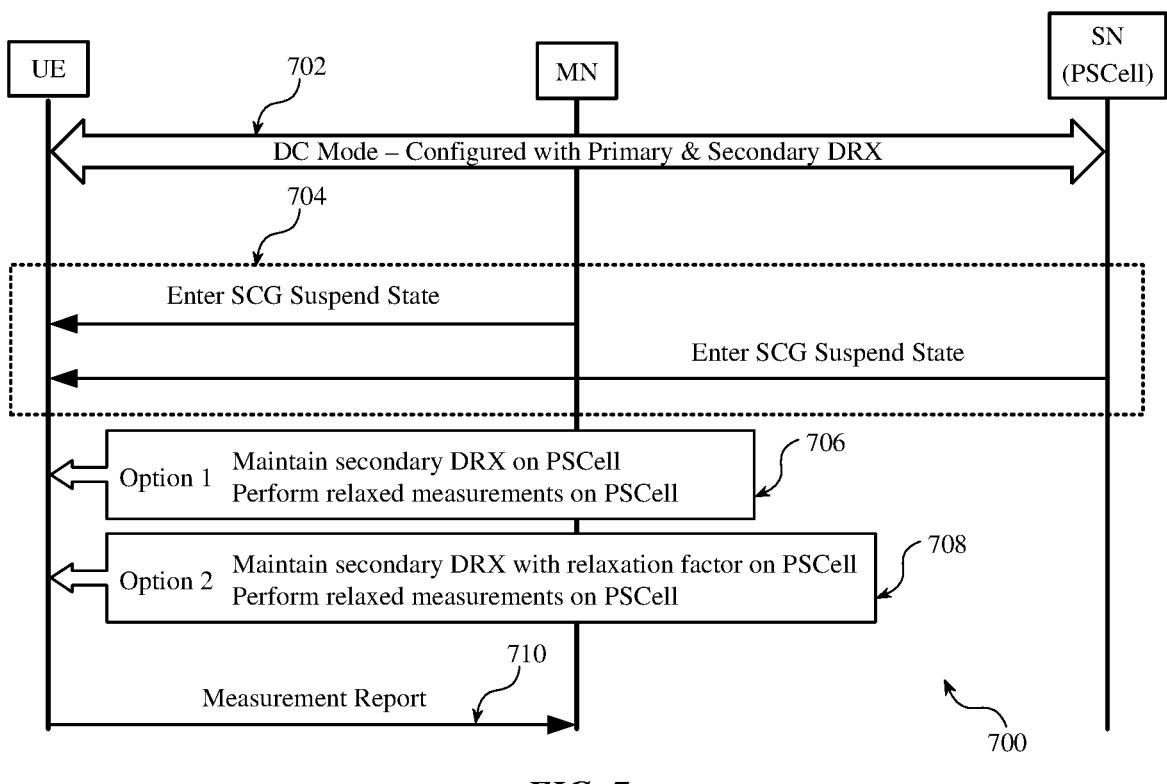
FIG. 7 illustrates a flow diagram of a method for second- ary cell group (SCG) suspended state relaxed measurements with a secondary discontinuous reception (DRX) configu- ration for the primary SCG cell (PSCell).
FIG. 8 illustrates a flow diagram of a method for second- ary cell group (SCG) suspended state relaxed measurements with a primary SCG cell (PSCell) measurement cycle (MeasCyclePSCell) configured for the PSCell.

FIG. 7 illustrates a flow diagram of a method 700 for SCG suspended state relaxed measurements with a secondary discontinuous reception (DRX) configuration for the PSCell. FIG. 7 illustrates a UE, a MN associated with a MCG including a MN BS, and a SN associated with a SCG including a PSCell.

At 702 the UE can be configured in a DC mode where the UE is connected to both the MN BS from the MN and the PSCell from the SN. The MN can transmit a configuration message to the UE, for example, through radio resource control (RRC) signaling. The configuration message can include a primary DRX configuration for the MCG and a secondary DRX configuration for the SCG that is different than the primary DRX configuration. The DRX configuration is a method employed between a BS and a UE to preserve battery life by various operations that may include switching off a RF module, suspending channel monitoring between data transmissions, and configuration of timers and periods by which cell operations are reduced. Often times a single, or primary, DRX configuration is employed between a BS and a UE. However, for DC operation, enhanced power savings and efficient signaling can be achieved by using a primary DRX configuration for the MCG and a secondary DRX configuration for the SCG allowing independent DRX activity on the MCG and SCG respectively. For example, the primary DRX can have a primary DRX cycle period and the secondary DRX can have a secondary DRX cycle period where the secondary DRX cycle period is greater than the primary DRX cycle period. The longer cycle period used by the secondary DRX for the SCG suspended state allows for increased battery preservation than if the primary DRX configuration were used for the SCG suspended state. Furthermore, the configuration message can include a DRX relaxation factor, which as described below, can be used in conjunction with the secondary DRX to increase the relaxed measurement period.

At 704 either the MN BS, or the PSCell, or both the MN BS and PSCell can transmit a SCG suspended state message to the UE. During certain traffic conditions, it may be advantageous to place the PSCell in a suspended state associated with the SCG. In a suspended state for the SCG, various measurements the UE may perform on the PSCell can be reduced to subsets of measurements, or measurements taken over longer periods, such reduced measurement can be considered as relaxed measurements. For example, where the UE might perform measurements on the PSCell over a broad bandwidth of frequencies, the relaxed measurements performed on the PSCell may include measurements over a narrower bandwidth of frequencies.

Furthermore, where a UE might perform measurements on the PSCell with a first periodicity, the relaxed measurements performed on the PSCell may occur according to a second periodicity that is longer than the first periodicity. Since the UE performs relaxed measurements in the suspended state for the SCG, the UE can use the relaxed measurements to enable a fast return to DC operations when required.

The UE can be configured with the SCG suspended state message, for example, through RRC signaling, medium access control (MAC) control element (CE) signaling, or Layer 1 (L1) signaling. Upon entering the SCG suspended state, the UE signaling to the SCG can be reduced. For example, physical downlink control channel (PDCCH) monitoring and random access channel (RACH)/physical uplink shared channel (PUSCH)/physical dedicated shared channel (PDSCH)/sounding reference signal (SRS) transmissions between the UE and SCG can be suspended. At 706, the UE can maintain the secondary DRX configuration on the SCG during the SCG suspended state, to perform relaxed measurements on the PSCell. The UE can use the secondary DRX configuration to determine Layer 3 (L3) relaxed measurement requirements for the SCG in the SCG suspended state. In some aspects, the relaxed measurements can be radio resource management (RRM) measurements that include one or more of a reference signal received power (RSRP) measurement, a reference signal received quality (RSRQ) measurement, or a signal to interference plus noise ratio (SINR) measurement according to the secondary DRX configuration. The relaxed measurements can also include other measurement types or management resources.

In an alternative aspect, at 708, the secondary DRX cycle period is modified according to the DRX relaxation factor during the SCG suspended state. For example, a measurement cycle can be lengthened by application of the secondary DRX configuration together with the DRX relaxation factor. The UE can use the secondary DRX configuration together with the DRX relaxation factor to determine the L3 relaxed measurement requirements on the SCG in the SCG suspended state. In some aspects, the relaxed measurements can be RRM measurements that include one or more of a RSRP measurement, a RSRQ measurement, or a SINR measurement according to the secondary DRX configuration modified by the DRX relaxation factor. The relaxed measurements can also include other measurement types or management resources.

By performing relaxed measurements according to the secondary DRX cycle or the DRX relaxation factor, the signaling from the UE is further reduced, and power savings are improved during the SCG suspended state.

At 710 the UE prepares and transmits a measurement report to the MN. The measurement report can include results of the relaxed RRM measurements. Furthermore, the measurement report can be transmitted according to a reporting period or report event triggers.

FIG. 8 illustrates a flow diagram of a method 800 for SCG suspended state relaxed measurements with a PSCell measurement cycle (MeasCyclePSCell) configured for the PSCell. A MN can transmit a measurement object (MeasObject) to the UE with objects by which the UE will perform measurements including, for example, the frequency/time location and sub-carrier spacing of reference signals to be measured. The MeasObject can include the MeasCyclePSCell which can include instructions defining the measurement requirements for the PSCell. The MeasCyclePSCell can be used for the PSCell in a suspended. FIG. 8 illustrates a UE, a MN associated with a MCG including a MN BS, and a SN associated with a SCG including a PSCell.

At 802 the UE can be configured in a DC mode where the UE is connected to both the MN BS from the MN and the PSCell from the SN. The MN can transmit a configuration message to the UE, for example, through RRC signaling. The configuration message can include the MeasObject that includes the MeasCyclePSCell configuration for the PSCell. The MeasCyclePSCell can correspond to a number of subframes (sf), for example, sf160 corresponding to 160 subframes, or sf320, sf640, sf1280, etc., or a time value, or slot periods, or other periodicities. Furthermore, the configuration message can include a PSCell relaxation factor. The PSCell relaxation factor can be used together with MeasCyclePSCell so as to change the length of a measurement cycle, thereby lengthening the periodicity by which measurements are taken by the UE according to the MeasCyclePSCell. Alternatively, the PSCell relaxation factor can be defined by a specification and already known by the UE.

At 804 either the MN BS, or the PSCell, or both the MN BS and PSCell can transmit a SCG suspended state message to the UE. The UE can be configured with the SCG suspended state message, for example, through RRC signaling, MAC CE signaling, or L1 signaling. Upon entering the SCG suspended state, the UE signaling to the SCG can be reduced. For example, PDCCH monitoring and RACH/PUSCH/PDSCH/SRS transmissions between the UE and SCG can be suspended.

At 806, the UE can maintain the MeasCyclePSCell configuration for the PSCell during the SCG suspended state, to perform relaxed measurements on the PSCell. The relaxed measurement cycle can be lengthened by the MeasCycleP-SCell together with the PSCell relaxation factor. The UE can use the MeasCyclePSCell configuration modified by the PSCell relaxation factor to determine L3 relaxed measurement requirements for the PSCell thereby increasing the period by which the UE takes measurements on the PSCell. In some aspects, the relaxed measurements can be RRM measurements that include one or more of a RSRP measurement, a RSRQ measurement, or a SINR measurement according to the MeasCyclePSCell configuration. The relaxed measurements can also include other measurement types or management resources. By performing relaxed measurements according to the MeasCyclePSCell and the PSCell relaxation factor, the signaling from the UE is further reduced, and power savings are improved during the SCG suspended state.

At 808 the UE prepares and transmits a measurement report to the MN. The measurement report can include results of the relaxed RRM measurements. Furthermore, the measurement report can be transmitted according to a reporting period or report event triggers.

Figure 9:
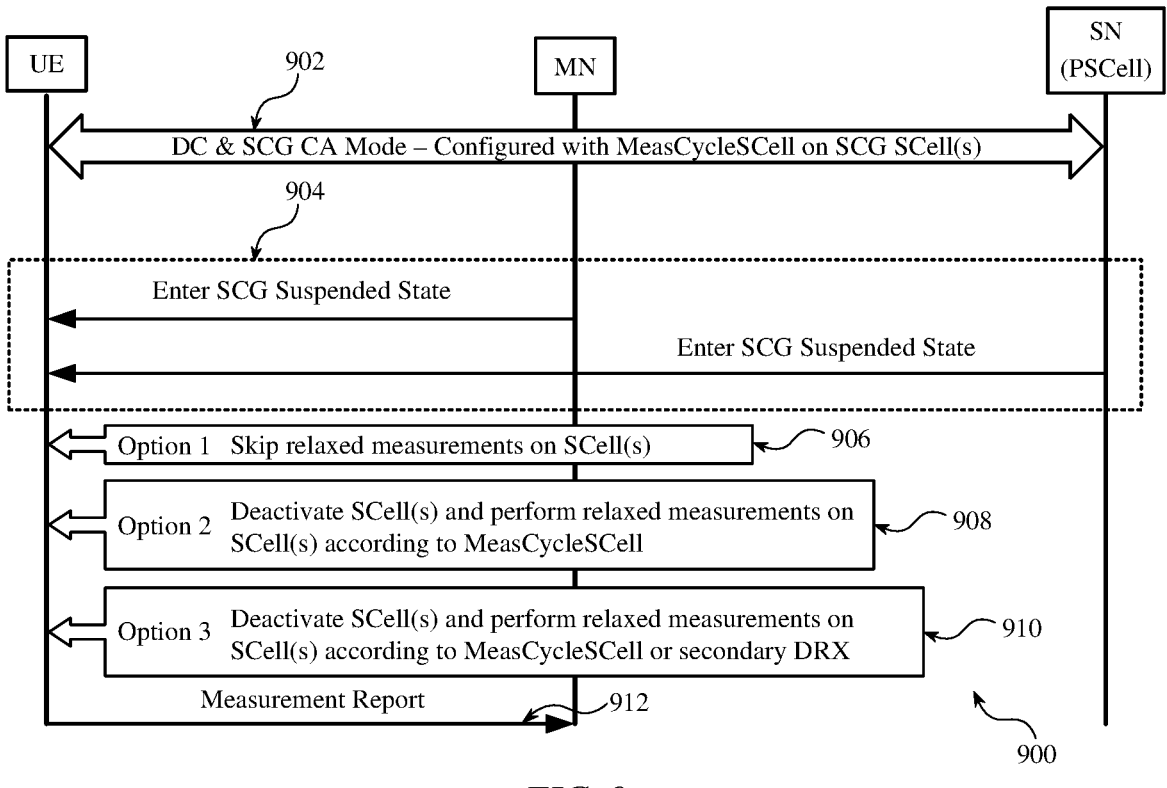
FIG. 9 illustrates a flow diagram of a method for second- ary cell group (SCG) suspended state relaxed measurements for one or more secondary cells (Scell(s)).

FIG. 9 illustrates a flow diagram of a method 900 for SCG suspended state relaxed measurements for one or more secondary cells (Scell(s)). Where FIGS. 7-8 are directed towards relaxed measurements on the PSCell, FIG. 9 is directed towards relaxed measurements on the one or more SCell(s) for the SCG suspended state. FIG. 9 illustrates a UE, a MN associated with a MCG including a MN BS, and a SN associated with a SCG including one or more SCell(s) and a PSCell.

At 902 the UE can be configured in a DC mode where the UE is connected to both the MCG and the SCG. Additionally, the UE can be configured in CA mode between the UE and MCG and or the UE and the SCG. The MN can transmit a configuration message to the UE, for example, through radio resource control (RRC) signaling. The configuration message can include a primary DRX configuration for the MCG and a secondary DRX configuration for the SCG that is different than the primary DRX configuration. Often times a single, or primary, DRX configuration is employed between a BS and a UE. However, for DC operation, enhanced power savings and efficient signaling can be achieved by using a primary DRX configuration for the MCG and a secondary DRX configuration for the SCG allowing independent DRX activity on the MCG and SCG respectively. For example, the primary DRX can have a primary DRX cycle period and the secondary DRX can have a secondary DRX cycle period where the secondary DRX cycle period is greater than the primary DRX cycle period. The longer cycle period used by the secondary DRX for the SCG suspended state allows for increased battery preservation than if the primary DRX configuration were used for the SCG suspended state. Furthermore, the configuration message can include a SCell relaxation factor, which as described below, can be used together with the secondary DRX to lengthen a measurement cycle of the relaxed measurement.

Alternatively, the SCell relaxation factor can be defined by a specification and already known by the UE. The configuration message can include a MeasObject that includes a SCell measurement cycle (MeasCycleSCell) configuration, and the configuration message can include a DRX relaxation factor.

At 904 either the MN BS, or the PSCell, or both the MN BS and PSCell can transmit a SCG suspended state message to the UE. The UE can be configured with the SCG suspended state message, for example, through RRC signaling, MAC CE signaling, or L1 signaling. Upon entering the SCG suspended state, the UE signaling to the SCG can be reduced. For example, PDCCH monitoring and RACH/PUSCH/PDSCH/SRS transmissions between the UE and SCG can be suspended.

At 906, the UE can consider the one or more SCell(s) as being in a deactivated state and skip relaxed measurements on the one or more SCell(s) during the SCG suspended state.

In an alternative aspect, at 908, the UE can consider the one or more SCell(s) as being in a deactivated state and maintain the MeasCycleSCell configuration for the one or more SCell(s) during the SCG suspended state, to perform relaxed measurements on the one or more SCell(s). The relaxed measurements on the one or more SCell(s) make it possible to enable a quicker CA connection between the UE and SCG when the SCG resumes than if the relaxed measurements were not taken during the SCG suspended state. A relaxed measurement cycle can be modified according to the SCell relaxation factor. In some aspects, the SCell relaxation factor can be a scalar that is multiplied by the relaxed measurement cycle period. For example, the relaxed measurement cycle can be lengthened according to the MeasCycleSCell together with the SCell relaxation factor. The UE can use the relaxed measurement according to the MeasCycleSCell configuration together with the SCell relaxation factor to determine L3 relaxed measurement requirements for the one or more SCell(s). In some aspects, the relaxed measurements can be RRM measurements that include one or more of a RSRP measurement, a RSRQ measurement, or a SINR measurement according to the MeasCycleSCell configuration. The relaxed measurements can also include other measurement types or management resources. By performing relaxed measurements according to the MeasCycleSCell and the SCell relaxation factor, the signaling from the UE is further reduced, and power savings are improved during the SCG suspended state.

In an alternative aspect, at 910, during the SCG suspended state, the UE can consider the one or more SCell(s) as being in a deactivated state. The secondary DRX configuration can have a first cycle period and the MeasCycleSCell can have a second cycle period. The UE can select either the secondary DRX configuration or the MeasCycleSCell according to which of the first and second cycle periods has a greater cycle period. It is appreciated that a cycle period can be considered as a period of time, a period of subframes, a period of slots, or another periodicity. If the selection is the secondary DRX configuration, the secondary DRX cycle period can be modified according to the DRX relaxation factor. If the selection is the MeasCycleSCell, the MeasCycleSCell can be modified according to the SCell relaxation factor.

The UE can use the selection to determine L3 relaxed measurement requirements for the one or more SCell(s). In some aspects, the relaxed measurements can be RRM measurements that include one or more of a RSRP measurement, a RSRQ measurement, or a SINR measurement according to the selection. The relaxed measurements can also include other measurement types or management resources.

By performing relaxed measurements according to the selection, the signaling from the UE is further reduced, and power savings are improved during the SCG suspended state.

The state switching on the one or more SCell(s), i.e. deactivation of the one or more SCell(s), at 906, 908, and 910 can be performed a number of ways. The state switching can be performed autonomously by the UE, or configured by RRC signaling, or configured through MAC CE with the SCG suspended state message.

At 912 the UE prepares and transmits a measurement report to the MN. The measurement report can include results of the relaxed RRM measurements. Furthermore, the measurement report can be transmitted according to a reporting period or report event triggers.

Figure 10:
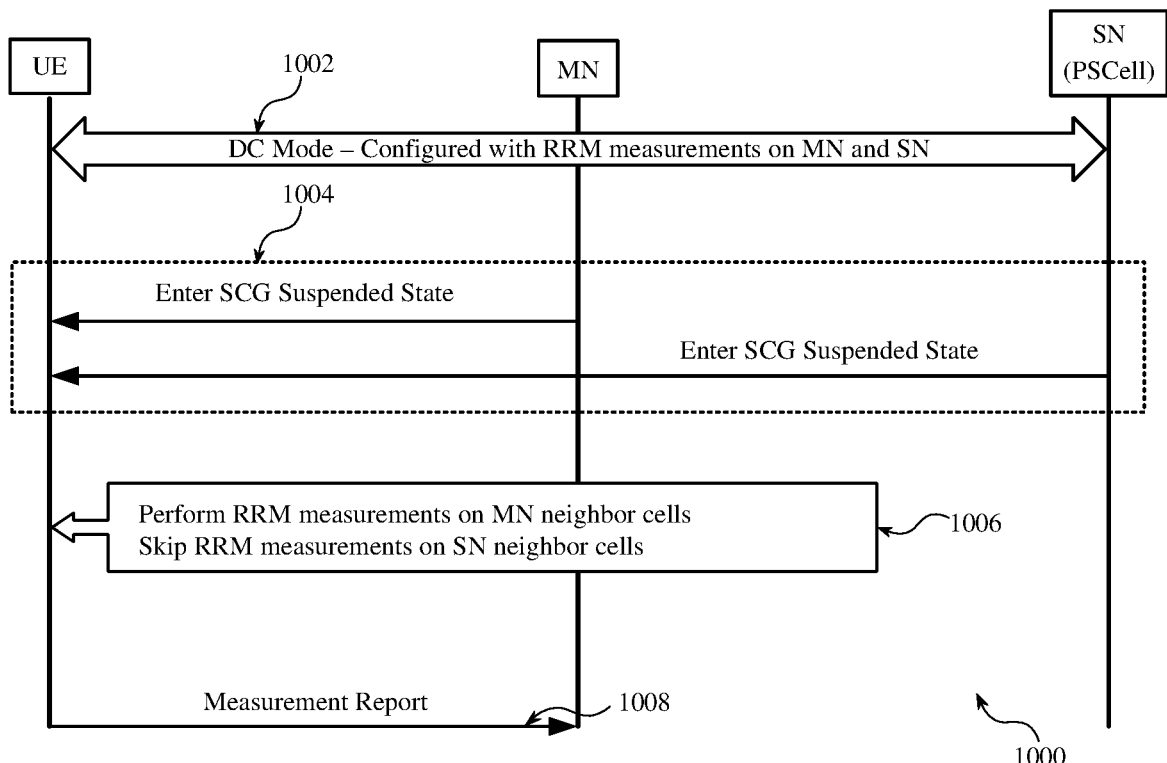
FIG. 10 illustrates a flow diagram of a method for secondary cell group (SCG) suspended state radio resource management (RRM) measurements for main node (MN) neighbor cells and secondary node (SN) neighbor cells.

FIG. 10 illustrates a flow diagram of a method 1000 for SCG suspended state RRM measurements for MN neighbor cells and SN neighbor cells. FIG. 10 illustrates a UE, a MN associated with a MCG including a MN BS, and a SN associated with a SCG including a PSCell. Furthermore, the UE is configured with MN neighbor cells and SN neighbor cells.

At 1002 the UE can be configured in a DC mode where the UE is connected to both the MN BS from the MN and the PSCell from the SN. The MN can transmit a configuration message to the UE, for example, through radio resource control (RRC) signaling. The configuration message can include a RRM measurement configuration for the MN and SN neighbor cells.

At 1004 either the MN BS, or the PSCell, or both the MN BS and PSCell can transmit a SCG suspended state message to the UE. The UE can be configured with the SCG suspended state message, for example, through RRC signaling, medium access control (MAC) control element (CE) signaling, or Layer 1 (L1) signaling. Upon entering the SCG suspended state, the UE signaling to the SCG can be reduced. For example, PDCCH monitoring and RACH/PUSCH/PDSCH/SRS transmissions between the UE and SCG can be suspended.

At 1006, the UE can maintain the RRM measurement configuration for the MN configured neighbor cells and perform RRM measurements on the MN configured neighbor cells during the SCG suspended state. In addition, the UE can skip performing RRM measurements on the SN configured neighbor cells. In some aspects, the RRM measurements can include one or more of a RSRP measurement, a RSRQ measurement, or a SINR measurement. By skipping RRM measurements on the MN neighbor cells, the signaling from the UE is further reduced, and power savings are improved during the SCG suspended state.

At 1008 the UE prepares and transmits a measurement report to the MN. The measurement report can include results of the relaxed RRM measurements. Furthermore, the measurement report can be transmitted according to a reporting period or report event triggers.

Figure 11:
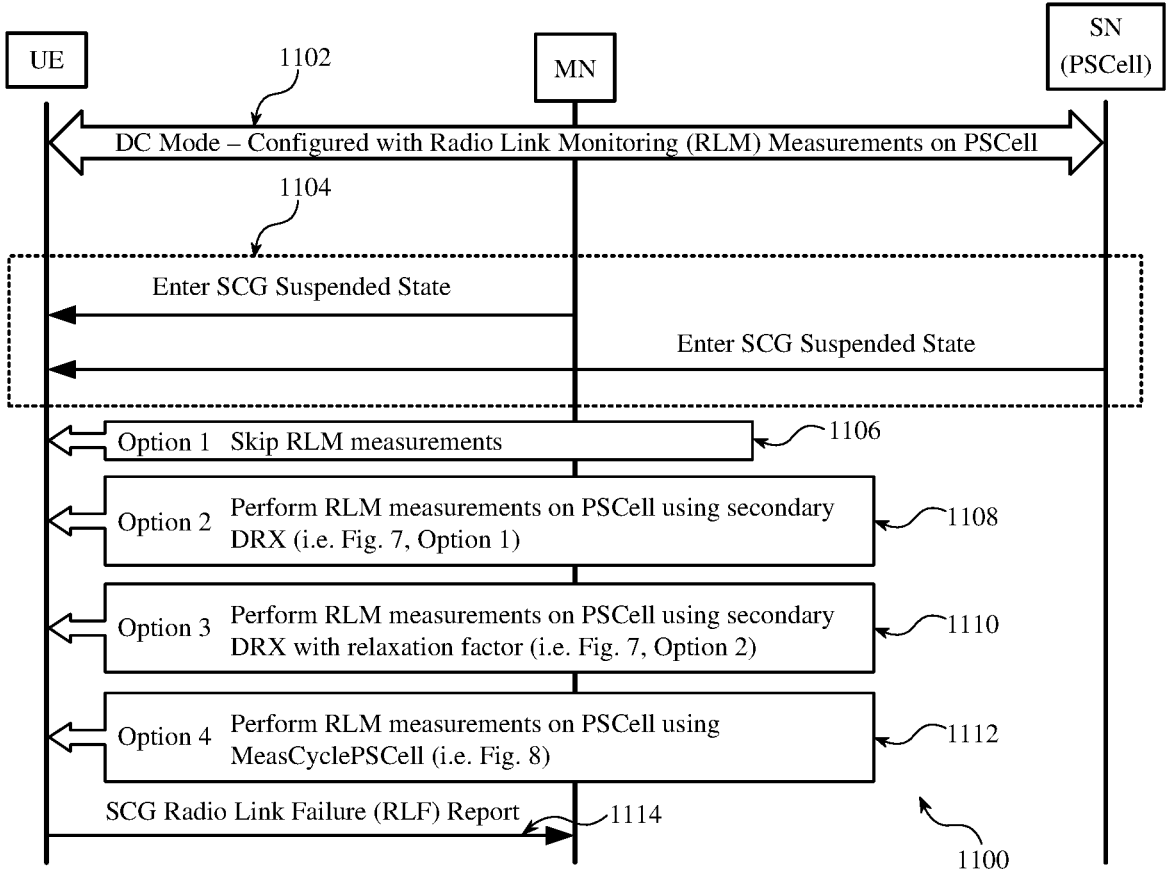
FIG. 11 illustrates a flow diagram of a method for secondary cell group (SCG) suspended state radio link monitoring (RLM) measurements for the primary SCG cell (PSCell).

FIG. 11 illustrates a flow diagram of a method 1100 for SCG suspended state radio link monitoring (RLM) measurements for the PSCell. FIG. 11 illustrates a UE, a MN associated with a MCG including a MN BS, and a SN associated with a SCG including a PSCell.

At 1102 the UE can be configured in a DC mode where the UE is connected to both the MN BS from the MN and the PSCell from the SN. The MN can transmit a configuration message to the UE, for example, through radio resource control (RRC) signaling. The configuration message can include a RLM measurement configuration on the PSCell that includes one or more of a primary DRX con-figuration for the MCG, a secondary DRX configuration for the SCG that is different than the primary DRX configuration, a DRX relaxation factor, a MeasObject that includes a MeasCyclePSCell configuration for the PSCell, and a relaxation factor. The MeasCyclePSCell can correspond to a number of subframes (sf), for example, sf160 corresponding to 160 subframes, or sf320, sf640, sf1280, etc., or a time value, or slot periods, or other periodicities. Alternatively, the PSCell relaxation factor can be defined by a specification and already known by the UE. For example, the primary DRX can have a primary DRX cycle period and the secondary DRX can have a secondary DRX cycle period where the secondary DRX cycle period is greater than the primary DRX cycle period.

At 1104 either the MN BS, or the PSCell, or both the MN BS and PSCell can transmit a SCG suspended state message to the UE. The UE can be configured with the SCG suspended state message, for example, through RRC signaling, MAC CE signaling, or L1 signaling. Upon entering the SCG suspended state, the UE signaling to the SCG can be reduced. For example, PDCCH monitoring and RACH/PUSCH/PDSCH/SRS transmissions between the UE and SCG can be suspended.

At 1106, during the SCG suspended state, the UE can skip performing RLM measurements on the PSCell. By skipping RLM measurements on the PSCell, the signaling from the UE is further reduced, and power savings are improved during the SCG suspended state.

In an alternative aspect, at 1108, the UE can perform relaxed measurements on the PSCell as described in FIG. 7, at 706, where the relaxed measurements are RLM measurements. Specifically, the UE can maintain the secondary DRX configuration on the SCG to perform relaxed measurements on the PSCell. The UE can use the secondary DRX configuration to determine L3 relaxed measurement requirements for the SCG in the SCG suspended state or a SCG resume state. The relaxed measurements can be RLM measurements according to the secondary DRX configuration. The relaxed measurements can also include other measurement types or management resources. The secondary DRX cycle period can be configured with a duration period that results in power savings when compared to the primary DRX cycle period.

In an alternative aspect, at 1110, a relaxed measurement cycle is modified according to the secondary DRX cycle period together with the DRX relaxation factor, as described in FIG. 7, at 708. The UE can use the secondary DRX configuration together with the DRX relaxation factor to determine the L3 relaxed measurement requirements on the SCG in the SCG suspended state. In some aspects, the relaxed measurements can be RLM measurements according to the secondary DRX configuration modified by the DRX relaxation factor. The relaxed measurements can also include other measurement types or management resources. By performing RLM measurement according to the secondary DRX cycle or the DRX relaxation factor, the signaling from the UE is further reduced, and power savings are improved during the SCG suspended state.

In an alternative aspect, at 1112, the UE can maintain the MeasCyclePSCell configuration for the PSCell, as described in FIG. 8, at 806, to perform relaxed measurements on the PSCell where the relaxed measurements are RLM measurements. Specifically, a relaxed measurement can be modified according to the MeasCyclePSCell together with the PSCell relaxation factor. The UE can use the MeasCyclePSCell configuration together with the PSCell relaxation factor to determine L3 relaxed measurement requirements for the PSCell. In some aspects, the relaxed measurements can be RLM measurements according to the MeasCyclePSCell configuration. The relaxed measurements can also include other measurement types or management resources. By performing RLM measurements according to the MeasCyclePSCell together with the PSCell relaxation factor, the signaling from the UE is further reduced, and power savings are improved during the SCG suspended state.

At 1114 the UE prepares and transmits a SCG radio link failure (RLF) report to the MN.

Figure 12:
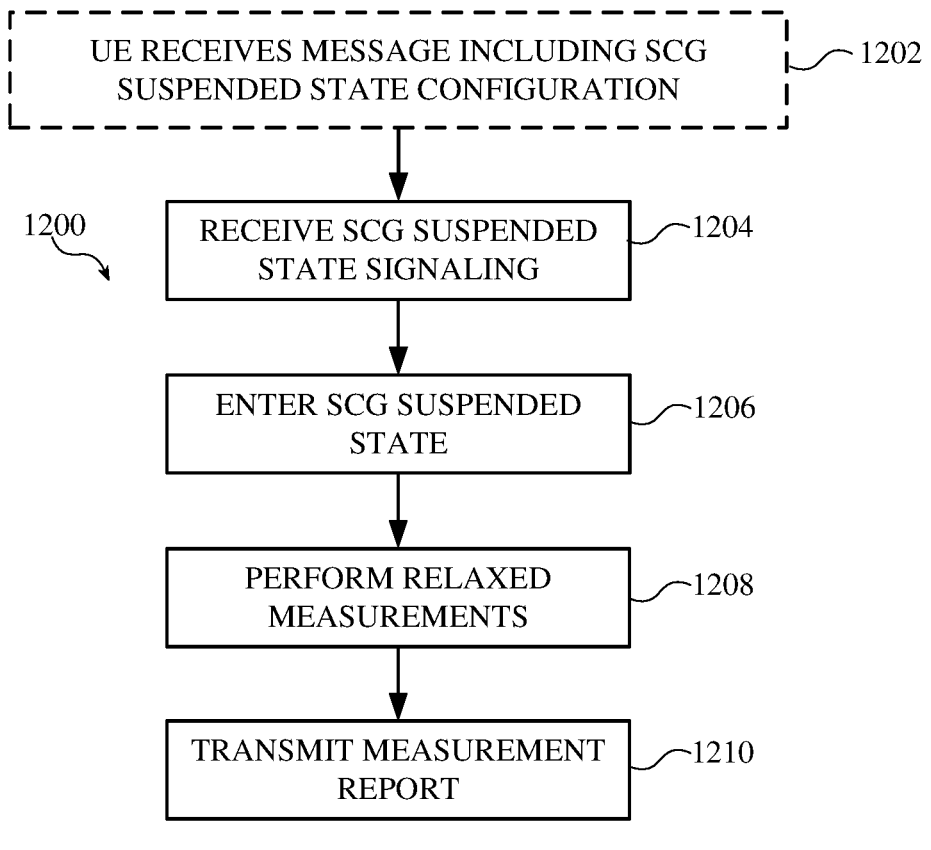
FIG. 12 is a flow diagram for a user equipment (UE) associated with a secondary cell group (SCG) suspended state.

FIG. 12 is a flow diagram 1200 for a UE associated with a SCG suspended state. At 1202, the UE can receive signaling including one or more of a DC mode and CA mode configuration where the UE can connect to both the MN BS from the MN and the PSCell from the SN, and can connect to one or more SCell(s) of the SCG. The UE can receive a configuration message, for example, through RRC signaling. The configuration message can include one or more of a primary DRX configuration for the MCG, a secondary DRX configuration for the SCG, a MeasObject that can include a MeasCyclePSCell and or a MeasCycleSCell, a PSCell relaxation factor, a SCell relaxation factor, a RLM measurement configuration, and a RRM measurement configuration. The configuration message can include one or more of the features described in FIG. 7 through FIG. 11.

At 1204, while the UE is in a DC mode, the UE can receive singling comprising an indication to enter a suspended state for the SCG. At 1206, after receiving signaling comprising an indication to enter the suspended state for the SCG, the UE can enter the SCG suspended state.

At 1208, after entering the SCG suspended state, the UE can perform relaxed measurements on one or more of a PSCell, Scell(s), MN neighbor cells, and SN neighbor cells. The performance of relaxed measurements can include one or more of the features and operations described in FIG. 7 through FIG. 11.

At 1210, after performing relaxed measurements, the UE can transmit a measurement report comprising one or more measurement results from the relaxed measurements. The measurement report can include one or more of the features described in FIG. 7 through FIG. 11.

Figure 13:
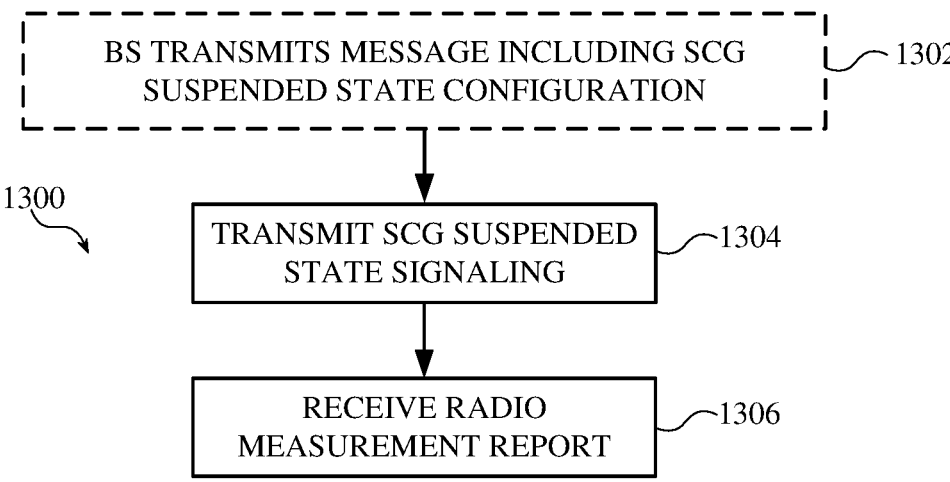
FIG. 13 is a flow diagram for a base station (BS) asso- ciated with a secondary cell group (SCG) suspended state.

FIG. 13 is a flow diagram 1300 for a BS associated with a SCG suspended state. At 1302, the BS can transmit signaling including one or more of a DC mode and CA mode configuration where the BS connects to a UE in a DC mode. The BS can transmit a configuration message, for example, through RRC signaling. The configuration message can include or more of a primary DRX configuration for a MCG, a secondary DRX configuration for a SCG, a MeasObject that can include a MeasCyclePSCell and or a MeasCycleSCell, a PSCell relaxation factor, a SCell relaxation factor, a RLM measurement configuration, and a RRM measurement configuration. The configuration message can include one or more of the features described in FIG. 7 through FIG. 11.

At 1304, while the BS is in a DC mode, the BS can transmit singling comprising an indication to enter a suspended state for the SCG.

At 1306, after transmitting signaling comprising an indication to enter a suspended state for the SCG, the BS can receive a radio measurement report. The measurement report can include one or more of the features described in FIG. 7 through FIG. 11.

Additional Examples

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a user equipment (UE) device, comprising: a memory; an antenna; a transceiver connected to the antenna; and a processor configured to: while in a dual connectivity (DC) mode where the UE is connected to a master node (MN) associated with a master cell group (MCG) and a secondary node (SN) associated with a secondary cell group (SCG) comprising a primary secondary cell (PSCell), receive a signaling from a base station (BS) comprising an indication to enter a suspended state for the secondary cell group (SCG), in response to the signaling, enter the suspended state for the SCG, while in the suspended state for the SCG, perform relaxed measurements on the PSCell; and send, to the BS, a measurement report comprising a one or more measurement results from the relaxed measurements.

Example 2 comprises the subject matter of any of example(s) 1, wherein the processor is further configured with a primary discontinuous reception (DRX) configuration for the MCG and a secondary DRX configuration for the SCG that is different than the primary DRX configuration, after the processor enters the suspended state for the SCG, the processor maintains the secondary DRX configuration for the PSCell; and the processor performs the relaxed measurements on the PSCell based on the secondary DRX configuration.

Example 3 comprises the subject matter of any of example(s) 2, wherein the relaxed measurements are based on the secondary DRX configuration and further modified according to a DRX relaxation factor.

Example 4 comprises the subject matter of any of example(s) 1, wherein the processor is further configured with a measurement object (MeasObject) that includes a PSCell measurement cycle (MeasCyclePSCell) for the SCG suspend state; and the relaxed measurements are based on the MeasCyclePSCell.

Example 5 comprises the subject matter of any of example(s) 4, wherein the relaxed measurements are further modified according to a PSCell relaxation factor.

Example 6 comprises the subject matter of any of example(s) 1-5, wherein the relaxed measurements are radio resource management (RRM) measurements that include one or more of a reference signal received power (RSRP) measurement, a reference signal received quality (RSRQ) measurement, or a signal to interference plus noise ratio (SINR) measurement, and the measurement report comprises a RRM measurement report.

Example 7 comprises the subject matter of any of example(s) 1-5, wherein the relaxed measurements are radio link monitoring (RLM) measurements; and the measurement report comprises a SCG radio link failure (RLF) report.

Example 8 comprises the subject matter of any of example(s) 1, wherein the processor is further configured to perform radio link monitoring (RLM) measurements on the PSCell, and after entering the suspended state for the SCG, the processor is further configured to skip performing RLM measurements on the PSCell.

Example 9 comprises the subject matter of any of example(s) 1, wherein the relaxed measurements are radio resource management (RRM) measurements and the SCG further comprises one or more secondary cells (SCells); and after entering the suspended state for the SCG, the processor is further configured to, cancel the RRM measurements on the one or more SCells.

Example 10 comprises the subject matter of any of example(s) 1, wherein the relaxed measurements are radio resource management (RRM) measurements, the SCG further comprises one or more secondary cells (SCells), and the processor is further configured with a measurement object (MeasObject) that includes a SCell measurement cycle (MeasCycleSCell); and after entering the suspended state for the SCG, the processor is further configured to, perform the RRM measurements on the one or more SCells according to the MeasCycleSCell and a SCell relaxation factor.

Example 11 comprises the subject matter of any of example(s) 10, wherein the processor is further configured with a primary discontinuous reception (DRX) configuration for the MCG and a secondary DRX configuration for the SCG that is different than the primary DRX configuration; wherein the secondary DRX configuration has a first cycle period and the MeasCycleSCell has a second cycle period, the processor selects either the secondary DRX configuration or the MeasCycleSCell according to which of the first and second cycle periods has a greater cycle period; and the RRM measurements are performed on the one or more SCells according to the selection.

Example 12 comprises the subject matter of any of example(s) 1, wherein the UE is configured with MN configured neighbor cells and SN configured neighbor cells, and after entering the suspended state for the SCG, the processor is further configured to, perform a radio resource management (RRM) measurements on the MN configured neighbor cells; and skip performing the RRM measurements on the SN configured neighbor cells.

Example 13 is a baseband processor, comprising: a memory interface; and processing circuitry communicatively coupled to the memory interface and configured to perform operations comprising: while in a dual connectivity (DC) mode where the baseband processor is connected to a master node (MN) associated with a master cell group (MCG) and a secondary node (SN) associated with a secondary cell group (SCG) comprising a primary secondary cell (PSCell), receiving a signaling from a base station (BS) comprising an indication to enter a suspended state for the secondary cell group (SCG), in response to the signaling from the BS, entering the suspended state for the SCG, while in the suspended state for the SCG, performing relaxed measurements on the PSCell; and generating a measurement report comprising a one or more measurement results from the relaxed measurements.

Example 14 comprises the subject matter of any of example(s) 13, wherein the operations further comprise a primary discontinuous reception (DRX) configuration for the MCG and a secondary DRX configuration for the SCG that is different than the primary DRX configuration, after entering the suspended state for the SCG, the operations further comprise maintaining the secondary DRX configuration for the PSCell; and the operations further comprise performing the relaxed measurements on the PSCell based on the secondary DRX configuration.

Example 15 comprises the subject matter of any of example(s) 14, wherein the relaxed measurements are based on the secondary DRX configuration and further modified according to a DRX relaxation factor.

Example 16 comprises the subject matter of any of example(s) 13, wherein the operations further comprise a measurement object (MeasObject) that includes a PSCell measurement cycle (MeasCyclePSCell) for the SCG suspend state; and the relaxed measurements are based on the MeasCyclePSCell.

Example 17 comprises the subject matter of any of example(s) 16, wherein the relaxed measurements are further modified according to a PSCell relaxation factor.

Example 18 comprises the subject matter of any of example(s) 13-17, wherein the relaxed measurements are radio resource management (RRM) measurements that include one or more of a reference signal received power (RSRP) measurement, a reference signal received quality (RSRQ) measurement, or a signal to interference plus noise ratio (SINR) measurement, and the measurement report comprises a RRM measurement report.

Example 19 comprises the subject matter of any of example(s) 13-17, wherein the relaxed measurements are radio link monitoring (RLM) measurements; and the measurement report comprises a SCG radio link failure (RLF) report.

Example 20 comprises the subject matter of any of example(s) 13, wherein the operations further comprise performing radio link monitoring (RLM) measurements on the PSCell, and after entering the suspended state for the SCG, the operations further comprise skipping RLM measurements on the PSCell.

Example 21 comprises the subject matter of any of example(s) 13, wherein the relaxed measurements are radio resource management (RRM) measurements and the SCG further comprises one or more secondary cells (SCells); and after entering the suspended state for the SCG, the operations further comprise, canceling the RRM measurements on the one or more SCells.

Example 22 comprises the subject matter of any of example(s) 13, wherein the relaxed measurements are radio resource management (RRM) measurements, the SCG further comprises one or more secondary cells (SCells), and the operations further comprise a measurement object (MeasObject) that includes a SCell measurement cycle (MeasCycleSCell); and after entering the suspended state for the SCG, the operations further comprise, performing the RRM measurements on the one or more SCells according to the MeasCycleSCell and a SCell relaxation factor.

Example 23 comprises the subject matter of any of example(s) 22, wherein the operations further comprise a primary discontinuous reception (DRX) configuration for the MCG and a secondary DRX configuration for the SCG that is different than the primary DRX configuration; wherein the secondary DRX configuration has a first cycle period and the MeasCycleSCell has a second cycle period, the operations further select either the secondary DRX configuration or the MeasCycleSCell according to which of the first and second cycle periods has a greater cycle period; and the RRM measurements are performed on the one or more SCells according to the selection.

Example 24 comprises the subject matter of any of example(s) 13, wherein the baseband processor is further configured with MN configured neighbor cells and SN configured neighbor cells, and after entering the suspended state for the SCG, the operations further comprise, performing a radio resource management (RRM) measurements on the MN configured neighbor cells; and skipping the RRM measurements on the SN configured neighbor cells.

Example 25 is a machine-readable medium comprising instructions that, when executed, cause a User Equipment (UE) to: while in a dual connectivity (DC) mode where the UE is connected to a master node (MN) associated with a master cell group (MCG) and a secondary node (SN)

associated with a secondary cell group (SCG) comprising a primary secondary cell (PSCell), receive a signaling from a base station (BS) comprising an indication to enter a suspended state for the secondary cell group (SCG), in response to the signaling, enter the suspended state for the SCG, while in the suspended state for the SCG, perform relaxed measurements on the PSCell; and generate a measurement report comprising a one or more measurement results from the relaxed measurements.

Example 26 comprises the subject matter of any of example(s) 25, wherein the instructions are further configured with a primary discontinuous reception (DRX) configuration for the MCG and a secondary DRX configuration for the SCG that is different than the primary DRX configuration, after entering the suspended state for the SCG, the instructions, when executed, further cause the UE to maintain the secondary DRX configuration for the PSCell; and perform the relaxed measurements on the PSCell based on the secondary DRX configuration.

Example 27 comprises the subject matter of any of example(s) 26, wherein the relaxed measurements are based on the secondary DRX configuration and further modified according to a DRX relaxation factor.

Example 28 comprises the subject matter of any of example(s) 25, wherein the instructions are further configured with a measurement object (MeasObject) that includes a PSCell measurement cycle (MeasCyclePSCell) for the SCG suspend state; and the relaxed measurements are based on the MeasCyclePSCell.

Example 29 comprises the subject matter of any of example(s) 28, wherein the relaxed measurements are further modified according to a PSCell relaxation factor.

Example 30 comprises the subject matter of any of example(s) 25-29, wherein the relaxed measurements are radio resource management (RRM) measurements that include one or more of a reference signal received power (RSRP) measurement, a reference signal received quality (RSRQ) measurement, or a signal to interference plus noise ratio (SINR) measurement, and the measurement report comprises a RRM measurement report.

Example 31 comprises the subject matter of any of example(s) 25-29, wherein the relaxed measurements are radio link monitoring (RLM) measurements; and the measurement report comprises a SCG radio link failure (RLF) report.

Example 32 comprises the subject matter of any of example(s) 25, wherein the instructions, when executed, further cause the UE to perform radio link monitoring (RLM) measurements on the PSCell, and after entering the suspended state for the SCG, the instructions, when executed, further cause the UE to skip performing RLM measurements on the PSCell.

Example 33 comprises the subject matter of any of example(s) 25, wherein the relaxed measurements are radio resource management (RRM) measurements and the SCG further comprises one or more secondary cells (SCells); and after entering the suspended state for the SCG, the instructions, when executed, further cause the UE to, cancel the RRM measurements on the one or more SCells.

Example 34 comprises the subject matter of any of example(s) 25, wherein the relaxed measurements are radio resource management (RRM) measurements, the SCG further comprises one or more secondary cells (SCells), and the instructions further comprise a measurement object (MeasObject) that includes a SCell measurement cycle (MeasCycleSCell); and after entering the suspended state for the SCG, the instructions, when executed, further cause the UE to, perform the RRM measurements on the one or more SCells according to the MeasCycleSCell and a SCell relaxation factor.

Example 35 comprises the subject matter of any of example(s) 34, wherein the instructions further comprise a primary discontinuous reception (DRX) configuration for the MCG and a secondary DRX configuration for the SCG that is different than the primary DRX configuration; wherein the secondary DRX configuration has a first cycle period and the MeasCycleSCell has a second cycle period, the instructions, when executed, further cause the UE to select either the secondary DRX configuration or the MeasCycleSCell according to which of the first and second cycle periods has a greater cycle period; and the RRM measurements are performed on the one or more SCells according to the selection.

Example 36 comprises the subject matter of any of example(s) 25, wherein the instructions, when executed, further cause the UE to configure MN configured neighbor cells and SN configured neighbor cells, and after entering the suspended state for the SCG, the instructions, when executed, further cause the UE to, perform a radio resource management (RRM) measurements on the MN configured neighbor cells; and skip performing the RRM measurements on the SN configured neighbor cells.

Example 37 is a Base Station (BS) comprising: a memory interface; a processor operably coupled to the memory interface, configured to perform operations comprising: send, to a user equipment (UE), a signaling comprising an indication to enter a suspended state for a secondary cell group (SCG); and receive, from the UE, a measurement report associated with the suspended state for the SCG, comprising a one or more measurement results from relaxed measurements.

Example 38 comprises the subject matter of any of example(s) 37, wherein the operations further comprise configuring the UE with a primary discontinuous reception (DRX) configuration for a master cell group (MCG) and a secondary DRX configuration for the SCG that is different than the primary DRX configuration.

Example 39 comprises the subject matter of any of example(s) 37, wherein the operations further comprise configuring the UE with a measurement object (MeasObject) that includes a PSCell measurement cycle (MeasCyclePSCell) for the suspended state for the SCG.

Example 40 comprises the subject matter of any of example(s) 37, wherein the operations further comprise configuring the UE with a measurement object (MeasObject) that includes a secondary cell (SCell) measurement cycle (MeasCycleSCell) for the suspended state for the SCG.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A baseband processor of a user equipment (UE), comprising:

a memory interface; and processing circuitry communicatively coupled to the memory interface that perform operations configured to:

while in a dual connectivity (DC) mode in a connected state with a master node (MN) associated with a master cell group (MCG) and in a connected state with a secondary node (SN) associated with a secondary cell group (SCG) comprising a primary secondary cell (PSCell), wherein the UE is configured with MN neighbor cells and SN neighbor cells:

receive a signaling comprising a PSCell measurement cycle (MeasCyclePSCell) defining a measurement cycle period of the PSCell, and an indication to enter a suspended state for the secondary cell group (SCG);

in response to the signaling enter the suspended state for the SCG;

increase the received MeasCyclePSCell by applying a PSCell relaxation factor;

while in the suspended state for the SCG;

maintain a radio resource management (RRM) measurement configuration for the MN neighbor cells;

perform relaxed measurements on the PSCell over the MeasCyclePSCell that is increased by the PSCell relaxation factor;

perform RRM measurements on the MN neighbor cells during the suspended state;

skip RRM measurements on the SN neighbor cells during the suspended state; and generate a measurement report comprising a one or more measurement results from the relaxed measurements and the RRM measurements.

2. The baseband processor of claim 1, wherein the operations further comprise a primary discontinuous reception (DRX) configuration for the MCG and a secondary DRX configuration for the SCG that is different than the primary DRX configuration, after entering the suspended state for the SCG, the operations further comprise maintaining the secondary DRX configuration for the PSCell;

determining a layer 3 relaxed measurement period based on the secondary DRX configuration; and the operations further comprise performing the relaxed measurements on the PSCell based on the determined layer 3 relaxed measurement period.

3. The baseband processor of claim 1, wherein the operations further comprise a measurement object (MeasObject) that includes the MeasCyclePSCell for the SCG suspend state.

4. The baseband processor of claim 1, wherein the relaxed measurements are radio link monitoring (RLM) measurements; and the measurement report comprises a SCG radio link failure (RLF) report.

5. The baseband processor of claim 1, wherein the operations further comprise performing radio link monitoring (RLM) measurements on the PSCell, and after entering the suspended state for the SCG, the operations further comprise skipping RLM measurements on the PSCell.

6. The baseband processor of claim 1, wherein the relaxed measurements are RRM measurements and the SCG further comprises one or more secondary cells (SCells); and after entering the suspended state for the SCG, the operations further comprise canceling the RRM measurements on the one or more SCells.

7. The baseband processor of claim 1, wherein the relaxed measurements are RRM measurements, the SCG further comprises one or more secondary cells (SCells), and the operations further comprise a measurement object (MeasObject) that includes a measurement cycle (MeasCycleSCell) of the one or more SCell; and after entering the suspended state for the SCG, the operations further comprise, performing the RRM measurements on the one or more SCells according to the MeasCycleSCell and a SCell relaxation factor.

8. The baseband processor of claim 7, wherein the operations further comprise a primary discontinuous reception (DRX) configuration for the MCG and a secondary DRX configuration for the SCG that is different than the primary DRX configuration;

wherein the secondary DRX configuration has a first cycle period and the MeasCycleSCell has a second cycle period;

the operations further select either the secondary DRX configuration or the MeasCycleSCell according to which of the first and second cycle periods has a greater cycle period; and the RRM measurements are performed on the one or more SCells according to the selection.

9. A non-transitory machine-readable medium comprising instructions that, when executed, cause a User Equipment (UE) to:

while in a dual connectivity (DC) mode in a connected state with a master node (MN) associated with a master cell group (MCG) and in a connected state with a secondary node (SN) associated with a secondary cell group (SCG) comprising a primary secondary cell (PSCell), wherein the UE is configured with MN neighbor cells and SN neighbor cells:

receive a PSCell measurement cycle (MeasCyclePSCell) defining a measurement cycle period of the PSCell, and an indication to enter a suspended state associated with the secondary cell group (SCG);

in response to the indication, enter the suspended state associated with the SCG;

increase the received MeasCyclePSCell by applying a PSCell relaxation factor;

while in the suspended state:

maintain a radio resource management (RRM) measurement configuration for the MN neighbor cells;

perform relaxed measurements on the PSCell over the MeasCyclePSCell that is increased by the PSCell relaxation factor;

perform RRM measurements on the MN neighbor cells during the suspended state;

skip RRM measurements on the SN neighbor cells during the suspended state; and generate a measurement report comprising a one or more measurement results from the relaxed measurements and the RRM measurements.

10. The non-transitory machine-readable medium of claim 9, wherein the SCG further comprises one or more secondary cells (SCells); and after entering the suspended state for the SCG, the instructions, when executed, further cause the UE to, cancel RRM measurements on the one or more SCells.

11. The non-transitory machine-readable medium of claim 9, wherein the SCG further comprises one or more secondary cells (SCells), and the instructions further comprise a measurement object (MeasObject) that includes a measurement cycle (MeasCycleSCell) of the one or more SCell; and after entering the suspended state for the SCG, the instructions, when executed, further cause the UE to;

perform RRM measurements on the one or more SCells according to the MeasCycleSCell and a SCell relaxation factor.

12. The non-transitory machine-readable medium of claim 11, wherein the instructions further comprise a primary discontinuous reception (DRX) configuration for the MCG and a secondary DRX configuration for the SCG that is different than the primary DRX configuration;

wherein the secondary DRX configuration has a first cycle period and the MeasCycleSCell has a second cycle period, the instructions, when executed, further cause the UE to select either the secondary DRX configuration or the MeasCycleSCell according to which of the first and second cycle periods has a greater cycle period; and the RRM measurements are performed on the one or more SCells according to the selection.

13. A user equipment (UE), comprising:

a memory device, a transceiver coupled to the memory device, and an antenna coupled to the transceiver; and a processor coupled to the transceiver and configured to cause the UE to:

while in a dual connectivity (DC) mode in a connected state with a master node (MN) associated with a master cell group (MCG) and in a connected state with a secondary node (SN) associated with a secondary cell group (SCG) comprising a primary secondary cell (PSCell), wherein the UE is configured with MN neighbor cells and SN neighbor cells:

receive a PSCell measurement cycle (MeasCyclePSCell) defining a measurement cycle period of the PSCell, and an indication to enter a suspended state for the secondary cell group (SCG);

in response to the indication, enter the suspended state for the SCG;

increase the received MeasCyclePSCell by applying a PSCell relaxation factor;

while in the suspended state for the SCG:

maintain a radio resource management (RRM) measurement configuration for the MN neighbor cells;

perform relaxed measurements on the PSCell over the MeasCyclePSCell that is increased by the PSCell relaxation factor;

perform RRM measurements on the MN neighbor cells during the suspended state;

skip RRM measurements on the SN neighbor cells during the suspended state; and transmit, by the antenna, a measurement report comprising a one or more measurement results from the relaxed measurements and the RRM measurements.

14. The UE of claim 13, wherein the relaxed measurements are radio link monitoring (RLM) measurements; and the measurement report comprises a SCG radio link failure (RLF) report.

15. The UE of claim 13, wherein the relaxed measurements are RRM measurements and the SCG further comprises one or more secondary cells (SCells); and after entering the suspended state for the SCG, the processor is further configured to cause the UE to cancel the RRM measurements on the one or more SCells.

16. The baseband processor of claim 7, wherein the operations further comprise autonomously performing state switching on one or more SCells during the suspended state for the SCG.

17. The non-transitory machine-readable medium of claim 9, wherein the instructions further comprise a primary discontinuous reception (DRX) configuration for the MCG and a secondary DRX configuration for the SCG that is different than the primary DRX configuration, wherein after entering the suspended state for the SCG, the instructions further comprise maintaining the secondary DRX configuration for the PSCell;

determining a layer 3 relaxed measurement period based on the secondary DRX configuration; and the instructions further comprise performing the relaxed measurements on the PSCell based on the determined layer 3 relaxed measurement period.

18. The non-transitory machine-readable medium of claim 11, wherein the instructions further comprise autonomously performing state switching on one or more SCells during the suspended state for the SCG.

19. The UE of claim 13, wherein the processor further configures a primary discontinuous reception (DRX) configuration for the MCG and a secondary DRX configuration for the SCG that is different than the primary DRX configuration, wherein after entering the suspended state for the SCG, the processor further causes the UE to maintain the secondary DRX configuration for the PSCell;

determine a layer 3 relaxed measurement period based on the secondary DRX configuration; and perform the relaxed measurements on the PSCell based on the determined layer 3 relaxed measurement period.

20. The UE of claim 15, further comprising autonomously performing state switching on one or more SCells during the suspended state for the SCG.

* * * * *